United States Patent Office 3,469,992
Patented Sept. 30, 1969

3,469,992
CHILL STABILITY AND FOAM ADHERENCE OF BEER
Frede B. Strandskov, North Caldwell, N.J., and Henry L. Ziliotto, Wantagh, N.Y., assignors to The T. & M. Schaefer Brewing Company, Brooklyn, N.Y.
No Drawing. Continuation-in-part of application Ser. No. 353,572, Mar. 20, 1964. This application Apr. 16, 1968, Ser. No. 721,634
Int. Cl. C12h 1/00
U.S. Cl. 99—48        5 Claims

ABSTRACT OF THE DISCLOSURE

A method is provided for improving the chill stability and foam adherence properties of finished, unpasteurized beer which has been preserved against microbial growth by the addition of heptyl para-hydroxybenzoate. The method comprises adding to and intimately admixing with the preserved beer a propylene glycol alginate alone or together with either cobalt or FS-26W. The present invention also provides the improved beer compositions.

---

This application is a continuation-in-part of application Ser. No. 353,572, filed Mar. 20, 1964 and now abandoned.

The present invention relates to improvements in the chemical preservation of beer and more particularly it relates to the improvement of the chill stability and the foam adherence properties of beer which has been preserved against microbial growth by the addition thereto of a chemical preservative.

It is a desideratum in the beer making art to eliminate the necessity for pasteurization or refrigeration of finished beer. This is desirable (1) to avoid possible deleterious effects on the taste of the commercial product; (2) to avoid having to keep the beer refrigerated in storage before consumption; and/or (3) to obtain saving in cost per unit produced. It is known that beer may be preserved against microbial growth and the above objects thus accomplished, by treating the finished beer with heptyl para-hydroxybenzoate, i.e., the heptyl ester of para-hydroxybenzoic acid as well as alkali metal or alkaline earth metal salts thereof. The discovery of the use of this compound to preserve finished beer represents a great advance in the art of beer making and provides the means by which the disadvantages of the necessity of pasteurization and/or refrigeration may be avoided. It has been discovered that the preservation in the above manner, however, tends to introduce complications which it is desirable to overcome if the most acceptable beer product is to be obtained.

In order to be commercially acceptable, a beer must possess certain properties; for example, it must be sparkling clear. Two additional properties which are most significant to beer connoisseurs are referred to as chill stability and foam adherence. The first of these relates to the property noted above as "sparkling clear." As the name implies, on occasion a haze forms in some beer when it is chilled. As the temperature of the beer is returned to room temperature, the haze disappears, only to reappear upon subsequent rechilling. This haze is referred to as chill haze. The second of these significant properties, foam adherence, is of special importance to the connoisseurs. This property relates to the adherence of the beer foam to the sides of the drinking glass as the foam collapses or as the glass is being emptied. Beer, which in all other respects has excellent potential, may be excluded from the market solely because of the lack of an acceptable level of foam adherence. One of the marks of a beer connoisseur is his appreciation of the significance of beer foam adherence to the sides of the drinking glass.

In the instant invention it is important to note that foam adherence is notably distinct from the property of foam retention. Foam retention, or foam life, is a quality denoting the ability of the "head," or layer of foam on a beer, to resist collapse with passage of time. Foam adherence as noted above refers to the ability of foam, as it collapses or as the beer is drained away, to leave a film of foam curtains or lace clinging to the walls of the container. It is from this curtain that the measurement of foam adherence is obtained. A significant foam curtain may be formed from beer, the head of which has completely collapsed and disappeared.

When finished beer is preserved against microbial growth by the addition thereto of heptyl para-hydroxybenzoate or a salt thereof, it has been found that adverse effects are sometimes produced on the acceptable values for chill stability and foam adherence. It is the object of the instant invention to overcome these adverse effects in order that the most commercially acceptable product possible may be obtained.

Additional objects will become apparent from the instant specification and claims.

It is to be noted that by means of the present invention the objects are accomplished without adversely affecting the preserved beer in any way, e.g. as to aroma, taste, body, etc.

In one aspect, the instant invention relates to accomplishing the above mentioned objects by providing a composition which comprises (1) beer preserved with heptyl para-hydroxybenzoate or an alkali metal or alkaline earth metal salt thereof, and (2) a propylene glycol alginate. Further, if desired the composition may contain cobalt. It has been found that the addition of a propylene glycol alginate alone or if desired with cobalt to the beer preserved with the heptyl para-hydroxybenzoate and intimately admixing therewith overcomes "deleterious" effects on chill stability of the beer engendered by the heptyl para-hydroxybenzoate or salt thereof alone.

Propylene glycol alginates are per se known and for example are disclosed in U.S. Patent No. 2,426,125. Any sufficiently soluble propylene glycol alginate, i.e., sufficiently soluble in the beer medium may be used for the purpose of this invention. Examples are amply provided in U.S. Patent No. 2,659,675. The preferred propylene glycol alginate is that prepared by a process disclosed in said Patent No. 2,659,675. As an example of commercially available propylene glycol alginates which are contemplated within the scope of this invention are Kelcoloid-O and Kelcoloid-L (Kelco Company, San Diego, Calif.), Kelcoloid-L being preferred. This preferred propylene glycol alginate is the one employed in the examples and comparative tests reported in the instant disclosure. As to the amount of propylene glycol alginate to be added, this may amount to as little as 20 parts per million parts of the composition (p.p.m.), a preferred range is from about 40 to about 120 parts per million, but an amount as high as 500 parts per million can be used.

For the purpose of this invention, any water soluble cobaltous salt which furnishes cobaltous ions in solution and does not otherwise detrimentally affect the other desirable properties of the beer may be utilized in the compositions. Examples of salts which may be used are cobaltous chloride, cobaltous nitrate, cobaltous citrate, cobaltous sulfate and cobaltous acetate or mixtures thereof. In the instant specification when the addition of cobalt is specified it is to be understood that this means cobaltous ion added in the form of a cobaltous salt. Concentrations referred to herein refer to cobaltous ion rather than to the cobalt salt.

The time of addition of the cobaltous ion to the beer is not particularly critical. It may be at any time after the fermentation is complete and may be either before or after the addition of the benzoate preservative. In a preferred aspect it is added after the first filtration of the beer and prior to the polish filtration. The amount added may be any non-toxic amount but from a practical standpoint it is preferred that the amount present in the final composition be between 0.1 to 10 parts by weight per million parts by volume of the composition (p.p.m.) based on the cobaltous ion.

The time of addition of the propylene glycol alginate is likewise not particularly critical and may be at any time after the fermentation is complete and before or after the addition of the benzoate preservative. In a preferred embodiment it is added after the first filtration but before the final filtration of the beer.

The addition of the heptyl para-hydroxybenzoate or salt thereof is a more critical aspect of the invention. It is preferred that it be added to the finished beer, that is after the final filtration. It may, however, be added prior to final filtration in those cases where a filter medium is used which does not adsorb the preservative. When referring to "finished" beer in the instant specification, it is intended to refer to beer that contains all of the necessary additives to make it a commercially acceptable product and which has been subjected to the polish filtration.

Although it is more convenient to add the propylene glycol alginate and, when desired, the cobalt, to beer in the same stock solution as the heptyl para-hydroxybenzoate or salt thereof, this is not necessary. They may be added separately and may even be added prior to the final filtration as indicated previously. It is preferred to add the propylene glycol alginate and the cobalt from a single stock solution directly into the beer stream following the first filtration, and to add the preservative benzoate to the beer stream following the final filtration.

The preferred embodiment according to this aspect of the invention resides in a composition of finished beer preserved with heptyl para-hydroxybenzoate and containing a propylene glycol alginate.

According to this aspect of the invention (1) individual stock solutions may be prepared containing the predetermined amounts of heptyl para-hydroxybenzoate or salt thereof, of propylene glycol alginate, and, if desired, of cobalt; or (2) stock solutions may be prepared containing the predetermined amounts of any of these elements in any combination. If a production quantity of beer is to be treated, the proper amount of stock solution(s) is added to the beer stream or to the beer in tanks at the desired stage in the plant operation. If laboratory quantities of beer are to be treated, the proper amount of stock solution of heptyl para-hydroxybenzoate or salt thereof is added to the empty bottle or can, the unpasteurized finished beer is placed in the package, and the package sealed. After the beer has come to rest, the package is unsealed, the proper amounts of stock solutions of the additives are added thereto, and the package is resealed. There is thus provided a beer composition which is preserved against microbial growth and need not be pasteurized or refrigerated and which in addition possesses commercially acceptable chill stability and foam adherence properties as well as the other properties which are indicative of a commercially acceptable beer.

In another aspect, the instant invention relates to accomplishing the stated objects by providing a composition which comprises (1) beer preserved with heptyl parahydroxybenzoate or an alkali metal or alkaline earth metal salt thereof, (2) propylene glycol alginate and (3) a composition referred to herein as FS-26W.

According to this aspect the propylene glycol alginate which is used is the same as that employed in the preceding aspect set forth herein. Moreover, the amount of this element utilized in the composition may be the same, and the requirements governing the time of addition to the composition are the same as in the previous aspect.

FS-26W is a composition which is composed of 70% by weight zinc sulfate ($ZnSO_4 \cdot H_2O$); 2.5% by weight calcium disodium ethylendiamine tetraacetic acid; 2.5% by weight glycine; and 25% by weight gum arabic (powder); it being understood that the composition may be varied slightly without materially altering the properties thereof.

The amount of FS-26W employed in the instant composition may be varied over wide limits while maintaining the advantages of its use. It is, however, preferred that it be employed in an amount of about 40 to about 120 parts per million parts of the total composition. The range of 60 to 120 p.p.m. being especially preferred.

The time of addition of the FS-26W to the beer is not particularly critical. It may be at any time after the fermentation is complete and may be before or after the addition of the heptyl para-hydroxybenzoate or salt thereof to the beer. In a preferred aspect it is added after the first filtration of the beer and prior to the polish filtration.

Although it is more convenient to add the propylene glycol alginate and FS-26W to the beer in the same stock solution as the preservative benzoate, this is not necessary. They may be added separately and may even be added prior to the final filtration as indicated previously. It is preferred to add the propylene glycol alignate and the FS-26W from a single stock solution directly into the beer stream following the first filtration, and add the preservative benzoate to the beer stream following the final filtration.

According to this aspect of the invention, (1) individual stock solutions may be prepared containing the predetermined amounts of heptyl para-hydroxybenzoate or salt thereof, of propylene glycol alginate, and of FS-26W; or (2) stock soliutions may be prepared containing the predetermined amounts of any of these elements in any combination. If a production quantity of beer is to be treated, the proper amounts of stock solution(s) is added to the beer stream or to the beer in tanks. There is thus provided a beer composition which is preserved against microbial growth and need not be pasteurized or refrigerated and which in addition possesses commercially acceptable chill stability and foam adherence properties as well as the other properties which are indicative of a commercially acceptable beer.

As is apparent from the foregoing discussion, the various aspects of the instant invention possess the common characteristic of beer preserved with heptyl para-hydroxybenzoate or a salt thereof and containing propylene glycol alginate and such composition constitutes the preferred embodiment. The additional elements of the various compositions, when present, differ, however; in one case being cobalt and in another being FS-26W. The separate compositions have additional common characteristics, to wit, the amounts of the heptyl para-hydroxybenzoate or salt thereof and propylene glycol alginate utilized fall within the same range in each composition; and the same or similar limitations regarding the time of addition of the elements to the composition in order to achieve the desired results are present.

The amount of the heptyl para-hydroxybenzoate or alkali metal or alkaline earth metal salt thereof employed in the compositions of the instant invention may vary wide limits. For the sake of the economical use of materials, however, it is preferred that the amount used lie in the range of about 5 to about 20 parts of benzoate per million parts of total composition. An especially preferred value is about 12 parts per million.

The specific examples which follow below are directed to lager beer. This is merely illustrative of the beer, such as lager, porter, stout, bock, ale and malt liquor which may be utilized. The invention, is equally effective with each of these beverages. Comparable data are obtained (with the same proportions) whether the package is a bottle, can or keg or tank; neither the package nor the size is of the essence.

Wherever "beer" is employed in the instant specification and claims, the subject matter applies to bock beer, porter and stout as well as to lager. Said subject matter applies also to ale and malt liquor. Further it applies equally as well to concentrated and reconstituted beers. In addition it is of no consequence how the beer is packaged, etc. cartons, bottles, cans or kegs or tank trucks, the present invention applies in each case.

In view of the fact that the instant invention is concerned with foam adherence and chill stability, it is necessary to have some standards for measuring the variables in order to obtain an appreciation of the problem and its solution. The following procedures and standards are employed for the purpose of the instant disclosure.

THE DETERMINATION OF BEER FOAM ADHERENCE

The procedure is that the Henry L. Zilietto, John B. Bockelmann and William Tirado of The F. & M. Schaefer Brewing Co., Brooklyn, N.Y. Said procedure was presented before the annual meeting of the American Society of Brewing Chemists in 1962. It comprises the creation of foam, the development of foam curtains and the measurement of foam adhering to the glass.

A. Formation of foam curtains

Attemperate beer at least over night at 10° C.

Use 6 oz. shell glasses that have been numbered on the side near the base and marked with five spots uniformly spaced around the periphery of the bottom, one of the marks being more pronounced than the others. These marks serve as position guides when reading the instrument. Pour the beer into a glass by the method for Foam Life (Ziliotto, H., and Bockelmann, John B., "American Society of Brewing Chemists Proceedings," 1954, page 108) to form a head of foam between 20 and 35 millimeters (mm.) in height. When the foam has collapsed (indicated by a change in color of the foam surface or by the beer's starting to show through), encircle the glass at the beer-foam interface with an 8" length of black adhesive tape of ¾" to 1" width. (The foam height at zero time and the rate of foam collapse need not be measured unless it is desired to determine Foam Life at the same time.) Immediately remove every drop of beer in the glass by means of an aspirator, taking care not to disturb the adhering foam. Let the glass dry in air a minimum of ten minutes, and measure the height of the exposed surface between the masking tape and the top of the glass. Wipe the exterior of the glass with a damp cloth and polish dry.

B. Instrument readings

The Radiometer described by Thorne, R. S. W., and Beckley, R. F., "Journal of the Institute of Brewing," 64, 38 (1958) is employed for making the readings, but the light intensity is reduced by inserting a variable rheostat in the lamp circuit in a manner that will not affect the operation of the built-in fan or other circuitry. Set the rheostat to given 60 volts for measurement of foam adhesion. Raise again to full current at the termination of the test for future turbidity readings.

On the leading edge of each vane of the centering mechanism of the instrument slip on a 45 mm. length of rubber tubing (6 mm. bore and 2 walls) that has been slit its full length. Fasten a piece of tape over the top end of the tubings so that they will not slip down. When in position, the bottom ends should just clear the top of the support described later. This modification properly centers the glasses despite slight differences in diameter between them and their support.

Do not use water in the cell compartment.

Place a stack of four discs centrally at the bottom of the compartment to act as a support for the glasses. The discs have a diameter just a trifle larger than that of the glasses (59 to 60 mm. diameter for a 55 mm. I.D., 58 mm. O.D., glass) and are painted a dull black. The bottom one is 25 mm. thick while each of the other three is 10 mm. thick.

Invert the glass with foam curtains onto the stack of discs and position the principal mark on the glass toward the light source. Close the cover of the instrument and after turning the current on, momentarily depress the lamp switch to activate the incident light. Note any deflection of the meter needle. Release the lamp switch and adjust the diaphragm dial by an amount estimated to be sufficient to bring the needle to zero. Repeat the illumination and the adjustment a number of times until a dial reading is obtained that is constant within 0.1 unit for a zero needle deflection. Record the reading. Rotate the glass one-fifth turn around its axis, using the marks on the glass for guides, and obtain a new reading as previously. Continue in this manner for five readings. If another level of adhered foam must be read, remove the topmost disc to lower the glass and obtain another five readings around the glass. Proceed thusly for a third level. Use the following table to decide on the number of levels to be measured.

| Height of foam curtains, mm.: | Number of levels to be measured |
|---|---|
| 0–14 | 1 |
| 15–24 | 2 |
| 25–36 | 3 |

Calculated to the second decimal the average of all readings.

Obtain blank readings on the clean glass without removing the type, by the procedure followed for the run. When blank readings have once been obtained on a glass at the three planes, use the data for subsequent determinations. Occasionally, recheck the readings to correct for surface changes.

Subtract the average blank reading from that of the run to obtain foam adhesion in the one glass. Report to the first decimal the grand average of six determinations (two pours from each of three replicate bottles, or single pours from six bottles) as the foam adhesion of the beer tested.

Tests have shown that no detectable change in readings of dry foam occur during three day's standing at room temperature. This finding makes it convenient to postpone reading the glasses in the instrument until all beers of a series have been poured. As a precautionary note, do not cover wet glasses for any reason inasmuch as the entrapped vapors dissolve the foam or change its appearance.

C. Visual readings

Subsequent to the cited publication estimations of the adhering foam have also been obtained visually as follows:

Critically examine the beer glass containing the dry film of foam and estimate the average percent of the circumferential surface between the masking tape and the top of the glass that was originally covered by foam bubbles. Express foam adhesion as one-tenth of the percentage figure obtained.

CHILL HAZE MEASUREMENT

The procedure utilized is that of The F. & M. Schaefer Brewing Co., Brookyln, N.Y., and as the procedure for the determination of foam adherence, does not constitute a part of the instant invention, it is described only to assist in the full appreciation of the data presented.

Chill the upright samples of bottled beer for the specified time in a bath maintained at 0° C.

Using a viewing box, such as the Clark turbidimeter (Cargille Scientific Co., New York, N.Y.), determine the turbidity of the sample by visually matching the haze of the supernatant fluid with the suspended haze of standards in bottles of the same shape and color as that containing the sample. The haze standards may be either the Formazin standards of the American Society of Brewing Chemists (A.S.B.C. Proceedings 1957, page 165) or suspension of insoluble substances that have been visually standardized against the Formazin standards. The Schaefer haze standards have nominal values ranging from 0 to 9, a unit of which is the visual equivalent of 30 Formazin units, i.e., a Schaefer haze of 2 equals 60 Formazin units.

Samples in cans are chilled as for bottled beer, but the beer is transferred to chilled flint bottles for the estimation of haze intensity.

Throughout the entire disclosure the relationship between parts by weight and parts by volume is the same as that between grams and milliliters; parts per million (p.p.m.) are uniformly parts by weight of additament (additive) per million parts by volume of finished product. In the examples, the beer to which no chemical preservative is added is pasteurized. All products to which any chemical preservative is added are unpasteurized lager beer. The beer is otherwise the same throughout the disclosure.

The chill haze measurement and the determination of foam adherence are in accordance with the procedures outlined above.

The following examples are intended to be merely illustrative of the claimed invention and not exhaustive thereof.

EXAMPLE I

Fill each of a group of clean, 12 oz. brown beer bottles with 12 oz. of cold, unpasteurized finished beer to which no preservative has been added. Foam up the beer to expel headspace air, and cap. Pasteurize a few bottles from this group. Each bottle prepared in this manner contains 355 ml. of pasteurized lager beer. These bottles of beer are utilized as the control in tests for foam adherence and chill stability, the results which appear in Table I.

Reserve, at 32° F., the remaining unpasteurized bottles of beer from this group for additional treatments as described in the following examples.

The following solutions are prepared to be utilized in the later examples:

Stock solution No. 1

Dissolve 1.42 grams (g.) of Kelcoloid–L (Kelco Co.)—a propylene glycol alginate produced in accordance with a process disclosed in U.S. Patent 2,659,675—hereinafter referred to as KDL, with vigorous agitation in sufficient water to make 100 milliliters (ml.) of solution. The addition of 0.5 ml. of this stock solution, containing 7.1 milligrams (mgms.) of KDL, to 355 ml. of beer yields a solution containing 20 p.p.m. of KDL. The addition of 1 ml. of this stock solution, containing 14.2 mgms. of KDL, to 355 ml. of beer yields a solution containing 40 p.p.m. of KDL.

Stock solution No. 2

Dissolve 0.852 gram of n-heptyl para-hydroxybenzoate in a sufficient amount of 95% ethanol to make 100 ml. of solution. The addition of 0.5 ml. of this stock solution, containing 4.3 mgms. of n-heptyl para-hydroxybenzoate, to 355 ml. of beer yields a solution containing 12 p.p.m. of the benzoate.

Stock solution No. 3

Dissolve 0.172 gram of cobaltous chloride hexahydrate ($CoCl_2 \cdot 6H_2O$) in sufficient water to make 100 ml. of solution. The addition of 0.4 ml. of this stock solution, containing 0.17 mgm. of cobaltous ion, to 355 ml. of beer yields a solution containing 0.5 p.p.m. of cobalt. The addition of 1 ml. of this stock solution, containing 0.43 mgm. of cobaltous ion, to 355 ml. of beer yields a solution containing 1.2 p.p.m. of cobalt.

Stock solution No. 4

Dissolve 2.13 grams of FS–26W (the composition is as previously disclosed in the specification), with vigorous agitation, in sufficient water to make 100 ml. of solution. The addition of 1 ml. of this stock solution, containing 21.3 mgm. of FS–26W, to 355 ml. of beer yields a solution containing 60 p.p.m. of FS–26W. The addition of 2 ml. of the stock solution, containing 42.6 mgm. of FS–26W, to 355 ml. of beer yields a solution containing 120 p.p.m. of FS–26W.

EXAMPLE II

Uncap several bottles of the cold unpasteurized beer from the group reserved in Example 1 and to each add 1 ml. of stock solution No. 1. Foam up the beer in the bottles to expel headspace air, and recap. Pasteurize these bottles, and subject them to chill stability and foam adherence tests. Each bottle prepared in this manner contains 355 ml. of pasteurized lager beer and 40 p.p.m. of propylene glycol alginate (Kelcoloid–L).

EXAMPLE III

Uncap several bottles of the cold unpasteurized beer from the group reserved in Example 1 and to each add 1 ml. of stock solution No. 3. Foam up the beer in the bottles to expel headspace air, and recap. Pasteurize these bottles, and subject them to chill stability and foam adherence tests. Each bottle prepared in this manner contains 355 ml. of pasteurized lager beer and 1.2 p.p.m. of cobalt.

EXAMPLE IV

Place 0.5 ml. of stock solution No. 2 (n-heptyl parahydroxybenzoate) into each of a group of clean, 12 oz. brown beer bottles. Fill each with 12 oz. of the same lot of cold unpasteurized finished beer as used in Example I. Foam up the beer to expel headspace air and recap. Each bottle prepared in this manner contains 355 ml. of unpasteurized, preservative-treated beer. The concentration of n-heptyl para-hydroxybenzoate present is 12 p.p.m.

Subject a few bottles of beer from this group to chill stability and foam tests, the results of which appear in Table 1.

Reserve at 32° F. the remaining bottles of beer from this group for additional treatments as described in the following examples.

EXAMPLE V

Uncap several bottles of the cold preservative-treated beer from the group reserved in Example IV and to each add 1 ml. of stock solution No. 1. Foam up the beer in the bottles to expel headspace air and recap. Each bottle prepared in this manner contains 12 p.p.m. of n-heptyl parahydroxybenzoate and 40 p.p.m. of propylene glycol alginate (Kelcoloid-L) in 355 ml. of unpasteurized, preservative-treated beer. Subject these bottles of beer to chill stability and foam adherence tests.

EXAMPLE VI

Uncap several bottles of the cold preservative-treated beer from the group reserved in Example IV and to each add 0.4 ml. of stock solution No. 3. Foam up the beer in the bottles to expel headspace air and recap. Each bottle prepared in this manner contains 12 p.p.m. of n-heptyl parahydroxybenzoate and 0.5 p.p.m. of cobalt in 355 ml. of unpasteurized, preservative-treated beer. Subject these bottles of beer to chill stability and foam adherence tests.

EXAMPLE VII

Uncap several bottles of the cold preservative-treated beer from the group reserved in Example IV and to each add 1.0 ml. of stock solution No. 3. Foam up the beer in the bottles to expel headspace air and recap. Each bottle prepared in this manner contains 12 p.p.m. of n-heptyl parahydroxybenzoate and 1.2 p.p.m. of cobalt in 355 ml. of unpasteurized, preservative-treated beer. Subject these bottles of beer to chill stability and foam adherence tests.

EXAMPLE VIII

Uncap several bottles of the cold preservative-treated beer from the group reserved in Example IV and to each add 0.4 ml. of stock solution No. 3 and 1.0 ml. of stock solution No. 1. Foam up the beer in the bottles to expel headspace air and recap. Each bottle prepared in this manner contains 12 p.p.m. of n-heptyl para-hydroxybenzoate, 0.5 p.p.m. of cobalt, and 40 p.p.m. of propylene glycol alginate (Kelcoloid-L) in 355 ml. of unpasteurized preservative-treated beer. Subject these bottles of beer to chill stability and foam adherence tests.

EXAMPLE IX

Uncap several bottles of the cold preservative-treated beer from the group reserved in Example IV and to each add 1.0 ml. of stock solution No. 3 and 1.0 ml. of stock solution No. 1. Foam up the beer in the bottles to expel headspace air and recap. Each bottle prepared in this manner contains 12 p.p.m. of n-heptyl para-hydroxybenzoate, 1.2 p.p.m. of cobalt, and 40 p.p.m. of propylene glycol alginate (Kelcoloid-L) in 355 ml. of unpasteurized preservative-treated beer. Subject these bottles of beer to chill stability and foam adherence tests.

headspace air and recap. Each bottle prepared in this manner contains 12 p.p.m. of n-heptyl para-hydroxybenzoate, 60 p.p.m. of FS–26W and 40 p.p.m. of propylene glycol alginate (Kelcoloid-L) in 355 ml. of unpasteurized preservative-treated beer. Subject these bottles of beer to chill stability and foam adherence tests.

EXAMPLE XIII

Uncap several bottles of the cold preservative-treated beer from the group reserved in Example IV and to each add 2.0 ml. of stock solution No. 4 and 1.0 ml. of stock solution No. 1. Foam up the beer in the bottles to expel headspace air and recap. Each bottle prepared in this manner contains 12 p.p.m. of n-heptyl para-hydroxybenzoate, 120 p.p.m. of FS–26W and 40 p.p.m. of propylene glycol alginate (Kelcoloid-L) in 355 ml. of unpasteurized preservative-treated beer. Subject these bottles of beer to chill stability and foam adherence tests.

In the following Table I the results of the determinations of chill stability and foam adherence properties of the beer compositions of the foregoing examples are set forth. The determination of the properties was in accordance with the description set forth previously herein.

TABLE I

Chill stability and and foam qualities of beer as affected by n-heptyl-p-hydroxybenzoate (WS-7)

| | | Storage time at 90° F. | | | | | | |
|---|---|---|---|---|---|---|---|---|
| | | Chill haze [1] | | | | | Foam adhesion [2] (visual) | |
| | | Fresh | 2 wks. | 4 wks. | 6 wks. | 8 wks. | 3 mo. | Fresh | 2 wks. |
| I | Control | 0 | 0 | 1 | 3 | 6 | 9+ | 7 | 7 |
| II | Kelcoloid-L (40 p.p.m.) | 0 | 0 | 0 | 1 | 1 | 2 | 7 | 7 |
| III | Cobalt, 1.2 p.p.m | 0 | 0 | 1 | 2 | 4 | 8 | 7 | 8 |
| IV | WS7, 12 p.p.m | 0 | 0 | 3 | 5 | 8 | 9+ | 4 | 3 |
| V | WS7, 12 p.pm. +Kelcoloid-L, 40 p.p.m | 0 | 0 | 3 | 3 | 4 | 5 | 4 | 3 |
| VI | WS7,12 p.p.m.+Cobalt, 0.5 p.p.m | 0 | 0 | 3 | 4 | 7 | 9+ | 5 | 5 |
| VII | WS7,12 p.p.m.+Cobalt, 1.2 p.p.m | 0 | 0 | 2 | 4 | 6 | 9+ | 4 | 6 |
| VIII | WS7,12 p.p.m.+Cobalt, 0.5 p.p.m.+Kelcoloid-L, 40 p.p.m | 0 | 0 | 2 | 3 | 3 | 4 | 4 | 4 |
| IX | WS7, 12 p.p.m.+Cobalt, 1.2 p.p.m.+Kelcoloid-L, 40 p.p.m | 0 | 0 | 2 | 2 | 3 | 4 | 6 | 5 |
| X | WS7, 12 p.p.m. + FS–26W, 60 p.p.m.+Kelcoloid-L, 20 p..pm | 0 | 1 | 2 | 4 | 4 | 6 | 7 | 6 |
| XI | WS7, 12 p.p.m.+FS–26W, 120 p.p.m.+Kelcoloid-L, 20 p.p.m | 1 | 2 | 5 | 5 | 8 | 8 | 6 | 6 |
| XII | WS7, 12 p.p.m.+FS–26W, 60 p.p.m.+Kelcoloid-L, 40 p.p.m | 0 | 1 | 2 | 3 | 5 | 5 | 6 | 6 |
| XIII | WS7, 12 p.p.m.+FS–26W, 120 p.p.m.+Kelcoloid-L, 40 p.p.m | 1 | 1 | 2 | 5 | 5 | 5 | 6 | 7 |

[1] Average of one or two replicate tests; 24 hrs. at 32° F. for fresh, 48 hrs. at 32° F. for aged (Bon Ami units).
[2] 12 replicates (2 pours each of 6 bottles).

EXAMPLE X

Uncap several bottles of the cold preservative-treated beer from the group reserved in Example IV and to each add 1.0 ml. of stock solution No. 4 and 0.5 ml. of stock solution No. 1. Foam up the beer in the bottles to expel headspace air and recap. Each bottle prepared in this manner contains 12 p.p.m. of n-heptyl para-hydroxybenzoate, 60 p.p.m. of FS–26W and 20 p.p.m. of propylene glycol alginate (Kelcoloid-L) in 355 ml. of unpasteurized preservative-treated beer. Subject these bottles of beer to chill stability and foam adherence tests.

EXAMPLE XI

Uncap several bottles of the cold preservative-treated beer from the group reserved in Example IV and to each add 2.0 ml. of stock solution No. 4 and 0.5 ml. of stock solution No. 1. Foam up the beer in the bottles to expel headspace air and recap. Each bottle prepared in this manner contains 12 p.p.m. of n-heptyl para-hydroxybenzoate, 120 p.p.m. of FS–26W and 20 p.p.m. of propylene glycol alginate (Kelcoloid-L) in 355 ml. of unpasteurized preservative-treated beer. Subject these bottles of beer to chill stability and foam adherence tests.

EXAMPLE XII

Uncap several bottles of the cold preservative-treated beer from the group reserved in Example IV and to each add 1.0 ml. of stock solution No. 4 and 1.0 ml. of stock solution No. 1. Foam up the beer in the bottles to expel From the foregoing examples it will be apparent that the following conclusions may be drawn:

A. The heptyl para-hydroxybenzoate reduces chill stability by two weeks and reduces foam adhesion by 50%. (Example IV vs. Example I.)

B. Incorporation into the beer, preserved with the heptyl para-hydroxybenzoate, of propylene glycol alginate alone more than restores the reduced chill stability of the preserved beer (Example V vs. Examples I and IV), and together with cobalt, additionally greatly restores the reduced foam adhesion (Example IX vs. Examples I and IV.)

C. Incorporation into the preserved beer of propylene glycol alginate and FS–26W more than restores the reduced chill stability and restores practically all the reduced foam adhesion. (Examples X, XII, XIII vs. Examples I and IV.)

In order to illustrate the operation of the instant invention in the plant production of the beer composition, the following example is given:

EXAMPLE XIV (A) Dissolve 13½ pounds (lbs.) of propylene glycol alginate (Kelcoloid-L) in three (3) barrels (bbls.) of water by very gradually adding the material to the water with vigorous agitation. Stir for approximately one half hour to yield a homogeneous solution. To this solution add 1.1 lbs. of cobaltous chloride hexahydrate and continue the agitation until dissolved.

Simultaneously with the proportional addition of other finishing compounds, proportion this solution into a stream of 900 bbls. of beer issuing from the filter subsequent to the lagering stage of brewing. The beer in the tank after this addition contains (60) p.p.m. Kelcoloid-L and 1.2 p.p.m. of cobalt.

(B) Prepare a two gallon stock solution of the sodium salt of n-heptyl para-hydroxybenzoate in the following manner:

The quantity of sodium hydroxide required to form the sodium salt of 136.2 grams of n-heptyl para-hydroxybenzoate is calculated as follows:

$$\frac{136}{236} \times 40 = 23 \text{ grams of NaOH per 136 grams of n-heptyl para-hydroxybenzoate}$$

236 = mol. wt. of n-heptyl para-hydroxybenzoate
40 = mol. wt. of NaOH

Dissolve the 23 grams of NaOH in two gallons of water. Dissolve 136.2 grams of n-heptyl para-hydroxybenzoate in 50 ml. of 45% ethyl alcohol. The alcohol solution is added to the two gallon solution of water and NaOH and the mixture is agitated constantly during the addition to assure rapid distribution. The pH of the final water solution is 11.2.

This water solution is proportioned into 100 bbls. of the beer from part (A) above as this beer flows from the final filter into the finished beer tank. The rate of flow from the final filter is 384 bbls. per hour. The water solution is pumped in over a period of 15.7 minutes which is the time required for 100 bbls. to flow from the final filter into the finish tank.

The beer obtained in the finish tank is preserved against microbial growth and possesses good chill stability and foam adherence properties as well as the other attributes of a comercially acceptable beer.

It is thought that the invention and its advantages will be understood from the foregoing description. As is apparent, various changes may be made without departing from the spirit and scope of the invention or sacrificing its material advantages.

Having described the invention, what is claimed is:

1. A composition which comprises beer preserved against microbial growth with a member selected from the group consisting of heptyl para-hydroxybenzoate, an alkali metal salt thereof and an alkaline earth metal salt thereof and having intimately admixed therewith 20–120 parts of a propylene glycol alginate per million parts of total composition.

2. A composition consisting essentially of finished unpasteurized beer preserved against microbial growth with heptyl para-hydroxybenzoate and having intimately admixed therewith about 40 parts of propylene glycol alginate per million parts of total composition.

3. A method for improving the chill stability properties of beer which has been preserved against microbial growth with a member selected from the group consisting of heptyl-para hydroxybenzoate, an alkali salt metal thereof, and an alkaline earth metal salt thereof, which comprises adding an intimately admixing with the beer from 20–120 parts of a propylene glycol alginate per million parts of total composition.

4. A method as in claim 3 wherein the additament is added to the beer prior to the addition of the benzoate preservative.

5. A method for improving the chill stablility properties of finished unpasteurized beer which has been preserved against microbial growth with heptyl para-hydroxybenzoate, which comprises adding to and intimately admixing with the beer about 20 to about 120 parts of propylene glycol alginate per million parts of total composition.

References Cited
UNITED STATES PATENTS

| | | | |
|---|---|---|---|
| 3,175,912 | 3/1965 | Strandskov et al. | 99—48 |
| 3,202,515 | 8/1965 | Stone | 99—48 |
| 3,266,902 | 8/1966 | Brennet | 99—48 |

LIONEL M. SHAPIRO, Primary Examiner

D. M. NAFF, Assistant Examiner

UNITED STATES PATENT OFFICE
CERTIFICATE OF CORRECTION

Patent No. 3,469,992                          September 30, 1969

Frede B. Strandskov et al.

It is certified that error appears in the above identified patent and that said Letters Patent are hereby corrected as shown below:

In the heading to the printed specification, lines 5 and 6, "The T. & M. Schaefer Brewing Company" should read -- The F. & M. Schaefer Brewing Company --.

Signed and sealed this 3rd day of March 1970.

(SEAL)
Attest:

Edward M. Fletcher, Jr.                   WILLIAM E. SCHUYLER, JR.
Attesting Officer                             Commissioner of Patents